(12) United States Patent
Xie et al.

(10) Patent No.: US 9,392,530 B2
(45) Date of Patent: Jul. 12, 2016

(54) TERMINAL ACCESS METHOD AND RADIO COMMUNICATION NETWORK

(75) Inventors: Feng Xie, Shenzhen (CN); Zhaohua Lu, Shenzhen (CN); Lin Chen, Shenzhen (CN); Jianjian Zhu, Shenzhen (CN)

(73) Assignee: ZTE Corporation, Shenzhen, GD (CN)

( * ) Notice: Subject to any disclaimer, the term of this patent is extended or adjusted under 35 U.S.C. 154(b) by 301 days.

(21) Appl. No.: 13/806,284

(22) PCT Filed: Nov. 16, 2010

(86) PCT No.: PCT/CN2010/078776
§ 371 (c)(1),
(2), (4) Date: Dec. 21, 2012

(87) PCT Pub. No.: WO2012/000271
PCT Pub. Date: Jan. 5, 2012

(65) Prior Publication Data
US 2013/0100870 A1    Apr. 25, 2013

(30) Foreign Application Priority Data
Jun. 29, 2010    (CN) .......................... 2010 1 0220405

(51) Int. Cl.
*H04W 76/02*    (2009.01)
*H04W 48/06*    (2009.01)

(52) U.S. Cl.
CPC .............. *H04W 48/06* (2013.01); *H04W 76/02* (2013.01)

(58) Field of Classification Search
CPC ............. H04W 76/02–76/021; H04W 76/121; H04W 48/08
USPC ............ 370/338; 455/411, 420, 422.1, 435.1, 455/437
See application file for complete search history.

(56) References Cited

U.S. PATENT DOCUMENTS 5,239,577 A    8/1993    Bates
8,477,811 B2 *    7/2013    Kitazoe .......................... 370/503
(Continued)

FOREIGN PATENT DOCUMENTS

| CN | 1937828 | 3/2007 |
| CN | 1964293 | 5/2007 |

(Continued)

OTHER PUBLICATIONS

An International Search Report dated Apr. 7, 2011, which issued during the prosecution of Applicant's PCT/CN2010/078776.

(Continued)

*Primary Examiner* — Christopher Grey
(74) *Attorney, Agent, or Firm* — Diederiks & Whitelaw, PLC (57) ABSTRACT

The disclosure discloses a terminal access method and a radio communication network. The method comprises: after a first terminal accesses the radio communication network, the radio communication network stores the first context information corresponding to a first identifier of the first terminal; the radio communication network receives an access request message from a second terminal, wherein the access request information carries a second identifier of the second terminal; the radio communication network establishes the second context information for the second terminal according to the first identifier, the first context information and the second identifier; and the radio communication network implements the access of the second terminal according to the second context information. In the disclosure, duplicate establishment of the same information in context information can be avoided, so that the non-data-service overhead of the radio communication network is reduced.

9 Claims, 7 Drawing Sheets

(56) References Cited

U.S. PATENT DOCUMENTS

| | | |
|---|---|---|
| 8,774,801 B2* | 7/2014 | Ore et al. .................... 455/435.1 |
| 2006/0116117 A1* | 6/2006 | Takase et al. ................. 455/420 |
| 2008/0096555 A1* | 4/2008 | Herrmann .................. 455/435.1 |
| 2010/0067371 A1* | 3/2010 | Gogic ............... H04W 36/0083 370/216 |
| 2010/0128664 A1* | 5/2010 | Denny et al. ................. 370/328 |
| 2010/0278147 A1* | 11/2010 | Horn .................... H04W 36/08 370/331 |
| 2011/0176530 A1* | 7/2011 | Vikberg et al. ............... 370/338 |
| 2013/0090087 A1* | 4/2013 | Kroeselberg ................. 455/411 |
| 2013/0150051 A1* | 6/2013 | Van Phan et al. ............ 455/437 |

FOREIGN PATENT DOCUMENTS

| | | |
|---|---|---|
| WO | 2006/069479 | 7/2006 |
| WO | 2012/000271 | 1/2012 |

OTHER PUBLICATIONS

An English Translation of the Written Opinion Apr. 7, 2011, which issued during the prosecution of Applicant's PCT/CN2010/078776.

An English Translation of the International Preliminary Report on Patentability Jan. 8, 2013, which issued during the prosecution of Applicant's PCT/CN2010/078776.

* cited by examiner

TERMINAL ACCESS METHOD AND RADIO COMMUNICATION NETWORK

CROSS-REFERENCE TO RELATED APPLICATIONS

This application represents a National Stage application of PCT/CN2010/078776 entitled "Method for Terminal Access and Wireless Communication Network" filed Nov. 16, 2010, pending.

FIELD OF THE INVENTION

The disclosure relates to the field of communication, in particular to a terminal access method and a radio communication network.

BACKGROUND OF THE INVENTION

A radio communication system generally consists of a terminal, an access service network and a content service network. The access service network plus the content service network can be called radio communication network, wherein the access service network comprises control stations (or base stations) and gateways. The radio communication network may be regarded as a set of equipments for providing services, and terminals or user equipments are equipments receiving services. The control stations in the radio communication network perform radio communication with terminals by electromagnetic waves. The radio communication network can provide radio coverage for terminals within a certain geographic range which is called a cell.

Figure 1:
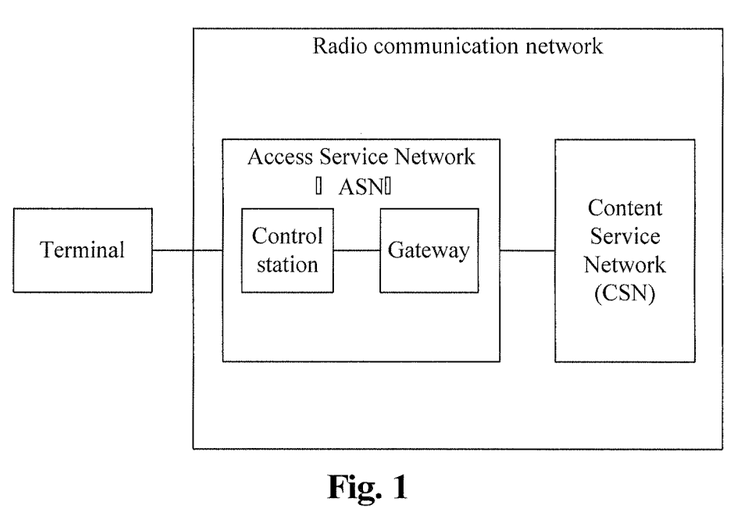
FIG. 1 is a diagram of a radio communication system according to the related technologies.

FIG. 1 is a diagram of a radio communication system according to related technologies. As shown in FIG. 1, the radio communication system comprises a terminal, a control station, a gateway and a content service network, wherein the control station and the gateway belong to the access service network. Both the access service network and the content service network belong to the radio communication network. "Terminal requests to access the network" means that the terminal requests to access (or connects to, or attaches to) the radio communication network, and communication between the terminal and the radio communication network is achieved by communication between the terminal and the control station. But processing of requests from the terminal may be done by different parts of the radio communication network. For example, it may be done by the control station, may be done by the gateway, and also may be done by the content service network (in which an Authentication, Authorization and Accounting (AAA) server is provided).

In the related technologies, terminals, for example, the mobile phones are corresponding to users one by one. That is, in the view of the radio communication network, one terminal is corresponding to one logic user. However, with the expansion of the application of the radio communication system to wider fields, various types of terminals (user equipments) can get services from the radio communication network. In these terminals, some terminals have multiple-to-one relations with users. That is, multiple terminals are corresponding to one user. For example, in the field of machine type communication (MTC, or machine to machine communications or Internet of Things), it is possible that several, dozens of or even more terminals belong to a same user.

Therefore, when the above multiple terminals access (or connect to, or attach to) the radio communication network, a huge non-data-service overhead may be caused to the radio communication network if the access of each terminal is implemented without differentiation.

SUMMARY OF THE INVENTION

If the access of each terminal is implemented without differentiation, huge non-data-service overhead can be caused to the radio communication network. The disclosure provides a terminal access method and a radio communication network, to solve the above problem.

To achieve the above purpose, according to one aspect of the disclosure, a terminal access method is provided.

The terminal access method according to the disclosure comprises: a radio communication network storing the first context information corresponding to a first identifier of a first terminal, after the first terminal accesses the radio communication network; the radio communication network receiving an access request message from a second terminal, wherein the access request message carries a second identifier of the second terminal; the radio communication network establishing the second context information for the second terminal according to the first identifier, the first context information and the second identifier; and the radio communication network implementing access of the second terminal according to the second context information.

Further, the step that the radio communication network establishes the second context information for the second terminal according to the first identifier, the first context information and the second identifier comprises: when the first identifier is an identifier dynamically allocated by the radio communication network during access process of the first terminal, the dynamically allocated identifier corresponding to the first context information, and the radio communication network storing the dynamically allocated identifier; the second identifier comprising a matching part configured to match the dynamically allocated identifier; the radio communication network determining whether the matching part is identical to the dynamically allocated identifier stored by the radio communication network; and if yes, the radio communication network using the first context information corresponding to the dynamically allocated identifier as the second context information.

Further, during the process that the first terminal accesses the radio communication network, the method further comprises: the first terminal acquiring the dynamically allocated identifier which is allocated by the radio communication network; and the first terminal sending the dynamically allocated identifier by broadcast, multicast and/or unicast.

Further, after the first terminal sends the dynamically allocated identifier by broadcast, multicast and/or unicast, the method further comprises: the second terminal receiving the dynamically allocated identifier; and the second terminal using the dynamically allocated identifier as the matching part of the second identifier and carrying the second identifier in the access request message to be sent to the radio communication network.

Further, the second terminal is a subordinate terminal of the first terminal.

Further, the step that the radio communication network establishes the second context information for the second terminal according to the first identifier, the first context information and the second identifier comprises: when the first identifier is a first access identifier used by the first terminal to access the radio communication network, the first access identifier corresponding to the first context information, and the radio communication network storing the first access identifier; the second identifier being a second access identifier used by the second terminal to access the radio communication network; the radio communication network acquiring a first shared identifier in the first access identifier according to a preset rule, wherein the first shared identifier is corresponding to a first shared part in the first context information; the radio communication network acquiring a second shared identifier in the second access identifier according to a preset rule, wherein the second shared identifier is corresponding to a second shared part in the second context information; the radio communication network determining whether the first shared identifier is identical to the second shared identifier; and if yes, the radio communication network using the first shared part as the second shared part and establishing the second context information according to the second shared part.

Further, when the second access identifier further comprises a second differentiation identifier, the step that the radio communication network establishes the second context information for the second terminal according to the first identifier, the first context information and the second identifier further comprises: the radio communication network establishing a second differentiation part of the second context information according to the second differentiation identifier; and the radio communication network considers the combination of the second shared part and the second differentiation part to be the second context information.

Further, when the first terminal and the second terminal are in a same group, the first terminal uses an identifier of the group as the first shared identifier, and the second terminal uses the identifier of the group as the second shared identifier.

Further, the step that the radio communication network establishes the second context information for the second terminal according to the first identifier, the first context information and the second identifier further comprises: if the first identifier and the second identifier cannot meet the relation of dynamically allocated identifier and matching part as mentioned above, and the first identifier and the second identifier cannot meet the relation of the first shared identifier and the second shared identifier as mentioned above, the radio communication network establishing the second context information for the second terminal.

Further, the radio communication network comprises at least one of: a control station and a gateway.

Further, both the first terminal and the second terminal comprise: a MTC terminal.

To achieve the above purpose, according to another aspect of the disclosure, a radio communication network is provided.

The radio communication network according to the disclosure comprises: a storage module, configured to, after a first terminal accesses a radio communication network, store first context information corresponding to a first identifier of the first terminal; a receiving module, configured to receive an access request message from a second terminal, wherein the access request message carries a second identifier of the second terminal; an establishment module, configured to establish second context information for the second terminal according to the first identifier, the first context information and the second identifier; and an access module, configured to implement the access of the second terminal according to the second context information.

With the disclosure, the radio communication network establishes context information for a newly accessing terminal according to the context information of the accessed terminal and implements the access of the newly accessing terminal. The problem of huge non-data-service overhead caused to the radio communication network if the access of each terminal is implemented without differentiation is solved. Duplicate establishment of the same information in context information can be avoided. Thus, the non-data-service overhead of the radio communication network is reduced.

BRIEF DESCRIPTION OF THE DRAWINGS

Drawings described herein are provided for further understanding of the disclosure and form one part of the application. The exemplary embodiments of the disclosure and descriptions thereof are used for explaining the disclosure and should not be considered to form improper limitation on the disclosure. In the drawings.

DETAILED DESCRIPTION OF THE EMBODIMENTS

It should be noted that the embodiments in the application and the features in the embodiments may be combined with each other if not conflicted. The disclosure is described hereinafter in detail with reference to drawings and in combination with embodiments.

Figure 2:
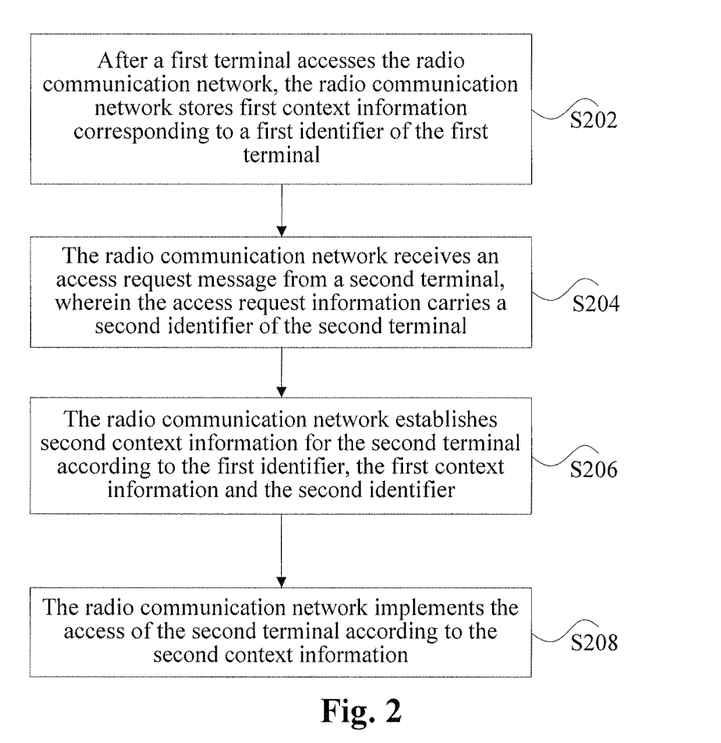
FIG. 2 is a flowchart of a terminal access method according to embodiments of the disclosure.

According to the embodiments of the disclosure, a terminal access method is provided. FIG. 2 is a flowchart of a terminal access method according to embodiments of the disclosure, comprising following Step S202 to Step S208.

Step S202: After a first terminal accesses the radio communication network, the radio communication network stores the first context information corresponding to a first identifier of the first terminal.

Step S204: The radio communication network receives an access request message from a second terminal, wherein the access request message carries a second identifier of the second terminal.

Step S206: The radio communication network establishes second context information for the second terminal according to the first identifier, the first context information and the second identifier.

Step S208: The radio communication network implements the access of the second terminal according to the second context information.

In the related technologies, a huge non-data-service overhead is caused to the radio communication network if the access of each terminal is implemented without differentiation. In the embodiments of the disclosure, when the first identifier of the first terminal is correlated to the second identifier of the second terminal, the first context information established for the first terminal is identical or similar to the second context information established for the second terminal. Therefore, the radio communication network establishing the second context information according to the first context information may avoid duplicate establishment of the same information in the first context information and the second context information. Thus, the non-data-service overhead of the radio communication network during the establishment of the second terminal is reduced.

Preferably, the step that the radio communication network establishes the second context information for the second terminal according to the first identifier, the first context information and the second identifier comprises that: when the first identifier is an identifier dynamically allocated by the radio communication network during the access process of the first terminal, the dynamically allocated identifier is corresponding to the first context information, and the radio communication network stores the dynamically allocated identifier; the second identifier comprises a matching part configured to match the dynamically allocated identifier; the radio communication network determines whether the matching part is identical to the dynamically allocated identifier stored by the radio communication network; and if YES, the radio communication network uses the first context information corresponding to the dynamically allocated identifier as the second context information.

In this preferred embodiment, the determining of whether the dynamically allocated identifier is identical to the matching part in the second identifier is simple to operate and easy to implement. Thus, the second context information may be established according to the first context information without increasing too much load for the radio communication network.

Preferably, during the process that the first terminal accesses the radio communication network, the method further comprises that: the first terminal acquires the identifier dynamically allocated by the radio communication network; and the first terminal sends the dynamically allocated identifier by broadcast and/or multicast and/or unicast.

To establish the second context information according to the first context information, it is necessary to ensure that the dynamically allocated identifier is identical to the matching part in the second identifier. In this preferred embodiment, the first terminal sends the first identifier by broadcast and/or multicast and/or unicast. Then, the second terminal and more terminals can simply acquire the first identifier and use the first identifier as its own identifier for accessing. Therefore, with this preferred embodiment, the duplicate establishment of the same information in the context information can be avoided. Thus, the non-data-service overhead of the radio communication network during the establishment of the second terminal is reduced.

Preferably, after the first terminal sends the dynamically allocated identifier by broadcast and/or multicast and/or unicast, the method further comprises that: the second terminal receives the dynamically allocated identifier; and the second terminal uses the dynamically allocated identifier as the matching part of the second identifier and carries the second identifier in the access request message to be sent to the radio communication network.

Preferably, the second terminal is a subordinate terminal of the first terminal.

It should be noted that when the second terminal is a subordinate terminal of the first terminal, the identifier used by the first terminal and the second terminal to access the radio communication network is identical. The first terminal and the second terminal may negotiate the identifier by a protocol different from the one for accessing the radio communication network.

Preferably, the step that the radio communication network establishes the second context information for the second terminal according to the first identifier, the first context information and the second identifier comprises that: when the first identifier is a first access identifier used by the first terminal to access the radio communication network, the first access identifier is corresponding to the first context information, and the radio communication network stores the first access identifier; the second identifier is a second access identifier used by the second terminal to access the radio communication network; the radio communication network acquires a first shared identifier in the first access identifier according to a preset rule, wherein the first shared identifier is corresponding to a first shared part in the first context information; the radio communication network acquires a second shared identifier in the second access identifier according to a preset rule, wherein the second shared identifier is corresponding to a second shared part in the second context information; the radio communication network determines whether the first shared identifier is identical to the second shared identifier; and if YES, the radio communication network uses the first shared part as the second shared part and establishes the second context information according to the second shared part.

As multiple terminals may share one identifier during the practical application, this identifier is called the terminal-shared identifier (i.e., the above shared identifier). These terminals sharing the same identifier may belong to the same user (for example, an enterprise). Sometimes, these terminals having the same terminal-shared identifier may be regarded as one group. In this case, the terminal-shared identifier may also be called the group identifier.

In addition, the terminal differentiation identifier is used to differentiate different terminals with the same terminal-shared identifier (when the terminal-shared identifier is a group identifier, the terminal differentiation identifier may also be called the member identifier). That is, when it is necessary to determine one terminal uniquely, the terminal-shared identifier plus the terminal differentiation identifier can be used. While in specific implementation, there are at least two following implementation methods.

Implementation Method 1

The radio communication system uses a terminal identifier 1 and an optional terminal identifier 2. For some terminals, only the terminal identifier 1 is used (referred to as method A). For other terminals, the terminal identifier 1 plus the terminal identifier 2 are used (referred to as method B). In this case, the terminal identifier 1 is the terminal-shared identifier, and the terminal identifier 2 is the terminal differentiation identifier. The terminal identifier 1 in method A and method B may be specified to be different. For example, certain bits of the terminal identifier 1 in method A and method B can be specified to differentiate method A and method B. Or, method A and method B may also be differentiated by an explicit indication. For example, whether the terminal uses method A or method B is indicated by one field in the request from the terminal.

Implementation Method 2

The radio communication system uses uniform terminal identifiers to identify terminals. But, for some terminals, the identifiers thereof may be divided into terminal-shared identifier and terminal differentiation identifier. For example, for the terminal identifier 1 of 48 bits, the first n bits are the terminal-shared identifier, and the last (48-n) bits are the terminal differentiation identifier.

Therefore, this preferred embodiment takes the shared identifier into consideration, and establishes the shared part in the context information according to the shared identifier. Thus, the second context information may be more flexibly established according to the first context information.

Preferably, when the second access identifier further comprises a second differentiation identifier, the step that the radio communication network establishes the second context information for the second terminal according to the first identifier, the first context information and the second identifier further comprises that: the radio communication network establishes a second differentiation part of the second context information according to the second differentiation identifier; and the radio communication network considers the combination of the second shared part and the second differentiation part to be the second context information.

In this preferred embodiment, the context information may be established by combining the shared part and the differentiation part. As the differentiation identifier is taken into consideration for the differentiation part, and the differentiation identifier may be used to differentiate a plurality of terminals, this preferred embodiment is more suitable for practical application.

Preferably, when the first terminal and the second terminal are in the same group, the first terminal uses the identifier of the group as the first shared identifier, and the second terminal uses the identifier of the group as the second shared identifier.

In this preferred embodiment, each terminal group contains a group identifier. Therefore, the group identifier is used as the shared identifier, which is simple and convenient to implement.

Preferably, the step that the radio communication network establishes the second context information for the second terminal according to the first identifier, the first context information and the second identifier further comprises that: if the first identifier and the second identifier cannot meet the relation of dynamically allocated identifier and matching part as mentioned above, and the first identifier and the second identifier cannot meet the relation of the first shared identifier and the second shared identifier as mentioned above, the radio communication network establishes the second context information for the second terminal.

In this preferred embodiment, when the first identifier has no correlation with the second identifier, the normal flow is that the second context information is established for the second terminal. This solution can ensure the correct establishment of the second context information.

Preferably, the radio communication network comprises at least one of the following devices: a controls station and a gateway.

Preferably, both the first terminal and the second terminal comprise: MTC terminal.

The implementation process of the embodiments of the disclosure is described in detail below in combination with specific cases.

Preferred Embodiment 1

Figure 3:
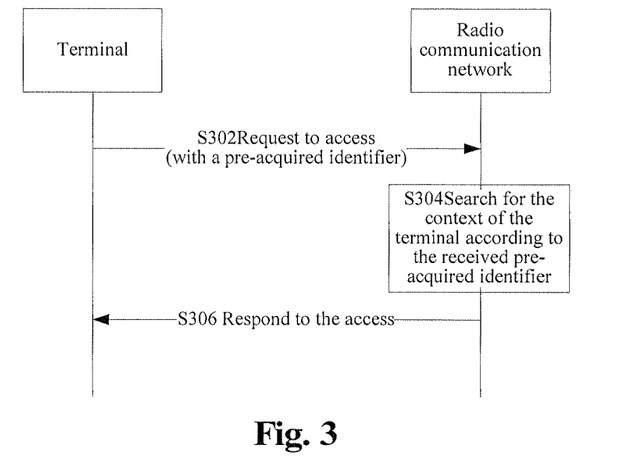
FIG. 3 is an interaction flowchart 1 according to a preferred embodiment 1 of the disclosure.

FIG. 3 is the interaction flowchart 1 according to the preferred embodiment 1 of the disclosure. As shown in FIG. 3, the following steps can be included.

Step S302: A terminal requests to access the network, carrying a pre-acquired identifier.

Step S304: The radio communication network looks for the context of the terminal according to the received pre-acquired identifier.

Step S306: The radio communication network responds to the access request of the terminal, and instructs the terminal to execute the simplified network access flow.

Figure 4:
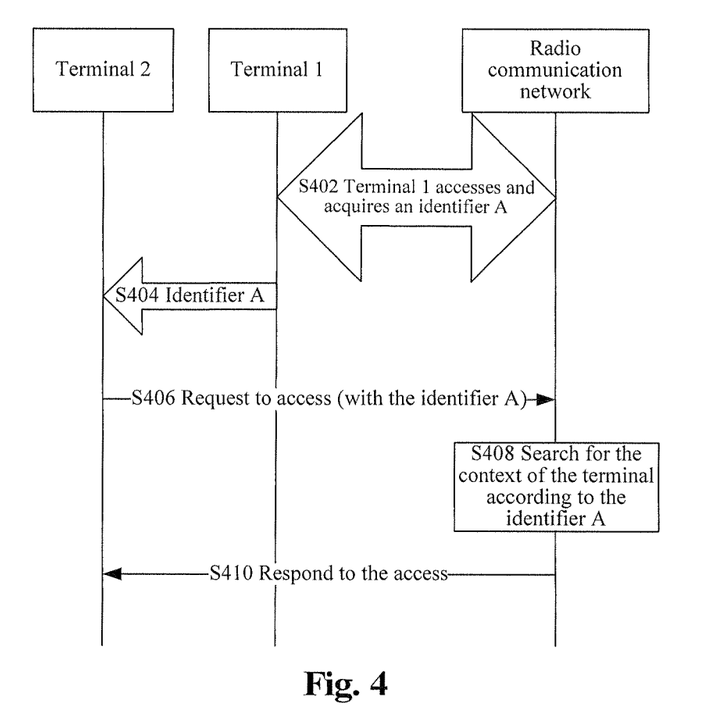
FIG. 4 is an interaction flowchart 2 according to the preferred embodiment 1 of the disclosure.

FIG. 4 is the interaction flowchart 2 according to the preferred embodiment 1 of the disclosure. As shown in FIG. 4, the following steps can be included.

Step S402: Terminal 1 accesses the radio communication network and acquires an identifier A.

Step S404: Terminal 1 sends the identifier A to terminal 2.

Step S406: Terminal 2 requests to access the radio communication network with the identifier A.

Step S408: The radio communication network looks for the context of the terminal according to the identifier A.

Step S410: The radio communication network responds to the access request, and instructs the terminal to execute the simplified network access flow.

The implementation process of the above preferred embodiment 2 will be described in detail below in combination with case 1 and case 2.

Case 1

It is assumed that terminals 1, 2, . . . , n (n>1) belong to users of similar type and these terminals have certain trustable relation between themselves (for example, they may belong to a same enterprise user). There is superior-subordinate relation between these terminals. For example, terminal 1 may be a superior node of other terminals (for example, terminal 1 may play a role of gateway in this group of terminals). When there is superior-subordinate relation between the terminals, the superior node accesses the radio communication network first, and acquires the identifier A after successful access (or connection, or attach). This identifier is used by the radio communication network to identify the serving users. Therefore, this identifier is also related to the context information maintained by the radio communication network for the terminals. Terminal 1 also maintains the context information related to the identifier A.

After receiving the identifier A from the radio communication network, terminal 1 sends the identifier A and the related context information to other terminals including terminal 2, by the inter-terminal communication protocol (this protocol may be different from or identical to the protocols used by the terminals to access the radio communication network). The way of sending may be broadcast, multicast and/or unicast.

After receiving the identifier A and the related context information, terminal 2 sends an access request message to the radio communication network, carrying the identifier A. After receiving the message, the radio communication network (for example, control station) looks for the matching context information according to the identifier A. If there is matching context information, the simplified network access flow may be executed (in this case, as the context information has been established when terminal 1 accesses the radio communication network, other terminals may execute the simplified network access flow). If there is no matching context information or the context information is expired, the radio communication network notifies the terminals that the access is failed and/or that it is necessary to execute the complete network access flow again (the complete network access flow may be redone by terminal 1).

Case 2

It is assumed that terminals 1, 2, . . . , n (n>1) belong to users of similar type and these terminals have certain trustable relation between themselves (for example, they may belong to a same enterprise user). These terminals are at the same level, and the flows of their access to the radio communication network are different due to the order of accessing of these terminals. It is assumed that terminal 1 accesses the radio communication network first, and acquires the identifier A after successful network access (by executing the complete network access flow). This identifier is used by the radio communication network to identify the serving users. Therefore, this identifier is also related to the context information maintained by the radio communication network for the terminals. Terminal 1 also maintains the context information related to the identifier A.

After receiving the identifier A from the radio communication network, terminal 1 sends the identifier A and the related context information to other terminals including terminal 2 by the inter-terminal communication protocol (this protocol may be different from or identical to the protocols used by the terminals to access the radio communication network). The way of sending may be broadcast, multicast and/or unicast.

After receiving the identifier A and the related context information, terminal 2 sends an access request message to the radio communication network, carrying the identifier A. After receiving the message, the radio communication network (for example, control station) looks for the matching context information according to the identifier A. If there is matching context information, the simplified network access flow may be executed (in this case, as the context information has been established when terminal 1 accesses the radio communication network, other terminals may execute the simplified network access flow). If there is no matching context information or the context information is expired, the radio communication network notifies the terminals that the access is failed and/or that it is necessary to execute the complete network access flow again.

In the above case 1 and case 2, terminal 1 accesses the radio communication network with the terminal-shared identifier (and the terminal differentiation identifier). The terminal-shared identifier is an identifier used by multiple terminals, in which the group identifier is contained. Then, the radio communication network establishes the terminal-shared context information according to the terminal-shared identifier, wherein the terminal-shared context information is corresponding to multiple terminals or to the terminal group. The terminals 1 and 2 also send the terminal differentiation identifier to the radio communication network during the network access flow, wherein the terminal differentiation identifier is used to differentiate different terminals with a same terminal-shared identifier. The radio communication network establishes the terminal differentiation context information according to the terminal differentiation identifier (and/or a newly allocated identifier related to this identifier).

Figure 5:
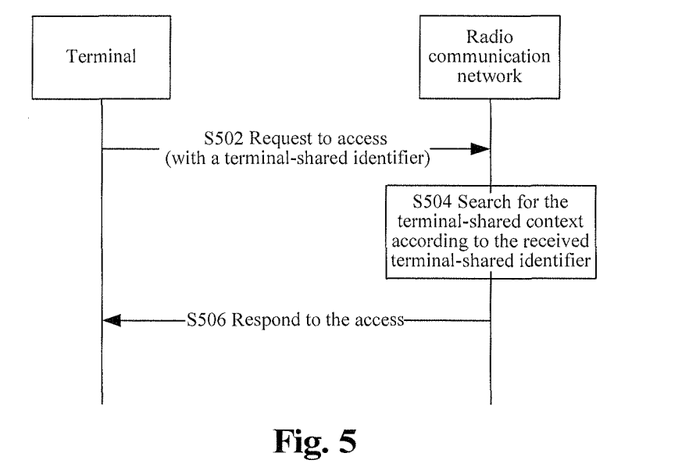
FIG. 5 is an interaction flowchart 1 according to a preferred embodiment 2 of the disclosure.

FIG. 5 is the interaction flowchart 1 according to the preferred embodiment 2 of the disclosure. As shown in FIG. 5, the following steps can be included.

Step S502: A terminal requests to access the network, wherein a terminal-shared identifier is carried.

Step S504: The radio communication network looks for the terminal-shared context according to the received terminal-shared identifier.

Step S506: The radio communication network responds to the access request of the terminal, and instructs the terminal to execute the simplified network access flow.

Figure 6:
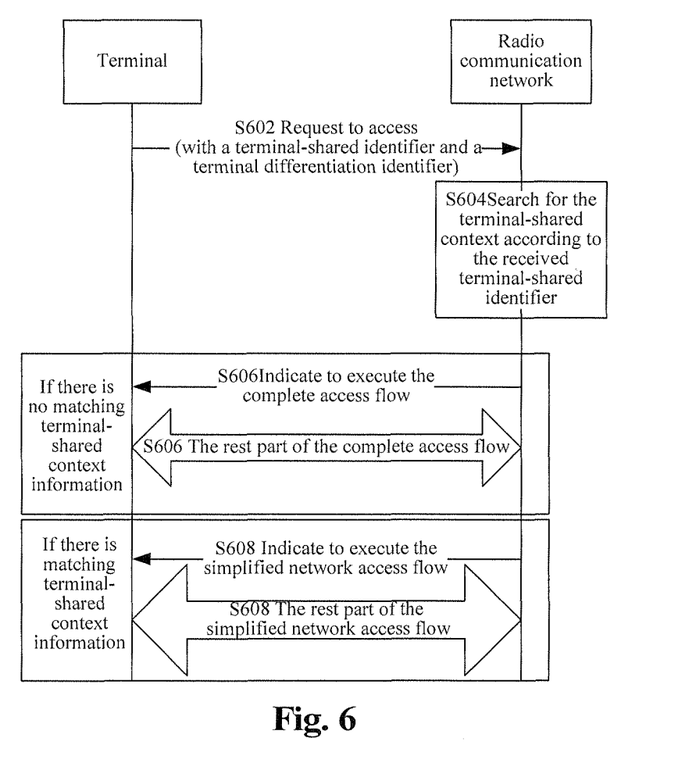
FIG. 6 is an interaction flowchart 2 according to the preferred embodiment 2 of the disclosure.

FIG. 6 is the interaction flowchart 2 according to the preferred embodiment 2 of the disclosure. As shown in FIG. 6, the following steps can be included.

Step S602: A terminal requests to access the network, carrying a terminal-shared identifier and a terminal differentiation identifier.

Step S604: The radio communication network looks for the terminal-shared context according to the received terminal-shared identifier.

Step S606: If there is no matching terminal-shared context information, the radio communication network responds to the access request of the terminal, and instructs the terminal to execute the rest part of the complete access flow.

Step S608: If there is matching terminal-shared context information, the radio communication network responds to the access request of the terminal, and instructs the terminal to execute the rest part of the simplified network access flow.

The implementation process of the above preferred embodiment 2 is described in detail in combination with case 3 and case 4.

Case 3

Figure 7:
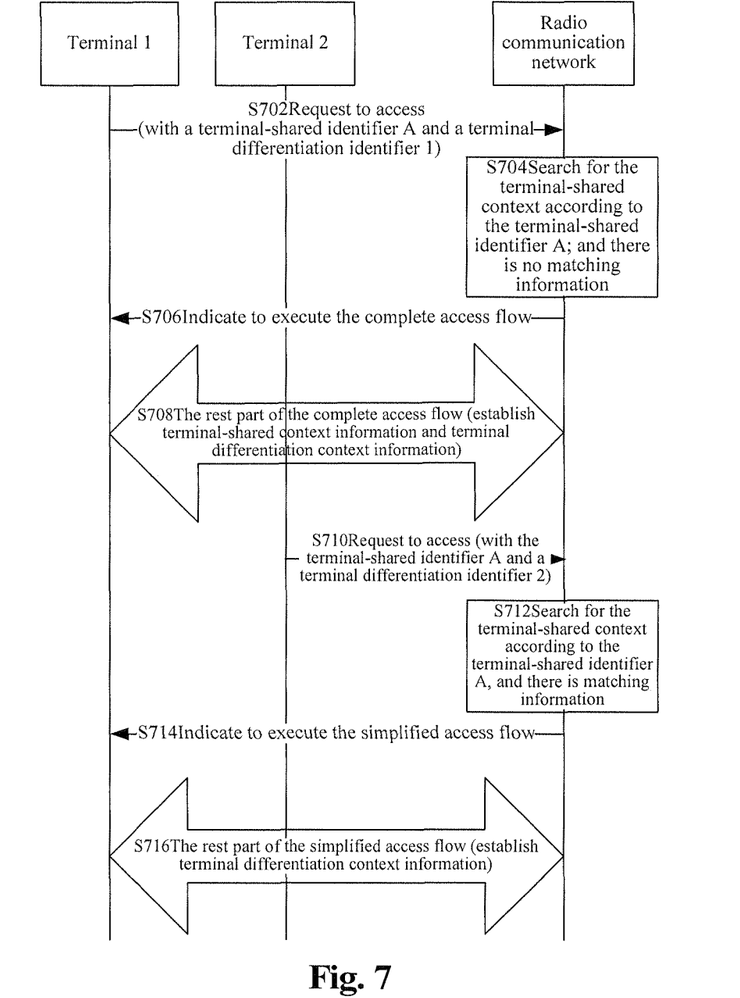
FIG. 7 is an interaction flowchart according to a case 3 of the disclosure.

FIG. 7 is the interaction flowchart according to case 3 of the disclosure. As shown in FIG. 7, the following steps can be included.

Step S702: Terminal 1 requests to access the network, carrying a terminal-shared identifier A and a terminal differentiation identifier 1.

Step S704: The radio communication network looks for the terminal-shared context according to the terminal-shared identifier A; and there is no matching information.

Step S706: The radio communication network responds to the access request of terminal 1, and indicates to execute the complete access flow.

Step S708: Terminal 1 and the radio communication network execute the rest part of the complete access flow, and establish the terminal-shared context information and the terminal differentiation context information.

Step S710: Terminal 2 requests to access the network, carrying the terminal-shared identifier A and a terminal differentiation identifier 2.

Step S712: The radio communication network looks for the terminal-shared context according to the terminal-shared identifier A; and there is matching information.

Step S714: The radio communication network responds to the access request of terminal 2, and indicates to execute the simplified access flow.

Step S716: Terminal 2 and the radio communication network execute the rest part of the simplified access flow, and establish the terminal differentiation context information.

It is assumed that terminals 1, 2, . . . , n (n>1) belong to users of the same type and these terminals have certain trustable relation between themselves (for example, they may belong to a same enterprise user). These terminals are at the same level, and the flows of their accessing to the radio communication network are different due to the order of accessing of these terminals. Also, there may be superior-subordinate relation between these terminals, so that the superior node typically accesses the radio communication network first. It is assumed that terminal 1 accesses the radio communication network first. Terminal 1 carries the terminal-shared identifier A and the terminal differentiation identifier 1 in the access request message. The radio communication network looks for the terminal-shared context according to the terminal-shared identifier A and there is no matching information. Then, the radio communication network instructs terminal 1 to execute the complete access flow.

After terminal 1 accesses the network successfully (by executing the complete network access flow), both the terminal-shared context information and the terminal differentiation context information is established.

Terminal 2 requests to access the radio communication network, carrying the terminal-shared identifier A and a terminal differentiation identifier 2. The radio communication network looks for the terminal-shared context according to the terminal-shared identifier A, and there is matching information. Then, the radio communication network responds to the access request of terminal 2, and indicates to execute the simplified network access flow. Then, terminal 2 and the radio communication network establish the terminal differentiation context information by the simplified network access flow.

It should be noted that while terminal 2 requests to access the network, terminal 1 may be still in the radio communication network or may have quitted (or disconnected/detached) from the radio communication network. When terminal 1 quits, the radio communication network needs to retain the terminal-shared context information. In the simplified network access flow, it may be that terminal 2 needs to make certain kind of contact with terminal 1 (the inter-terminal communication protocol may be different from or identical to protocols used by the terminals to access the radio communication network, and terminal 1 may send the terminal-shared context information to terminal 2 by broadcast, multicast and/or unicast). Then, terminal 2 can receive the terminal-shared context information (including information about security) from terminal 1. And terminal 2 executes the subsequent processing of the simplified network access flow according to the received terminal-shared context information.

Case 4

Figure 8:
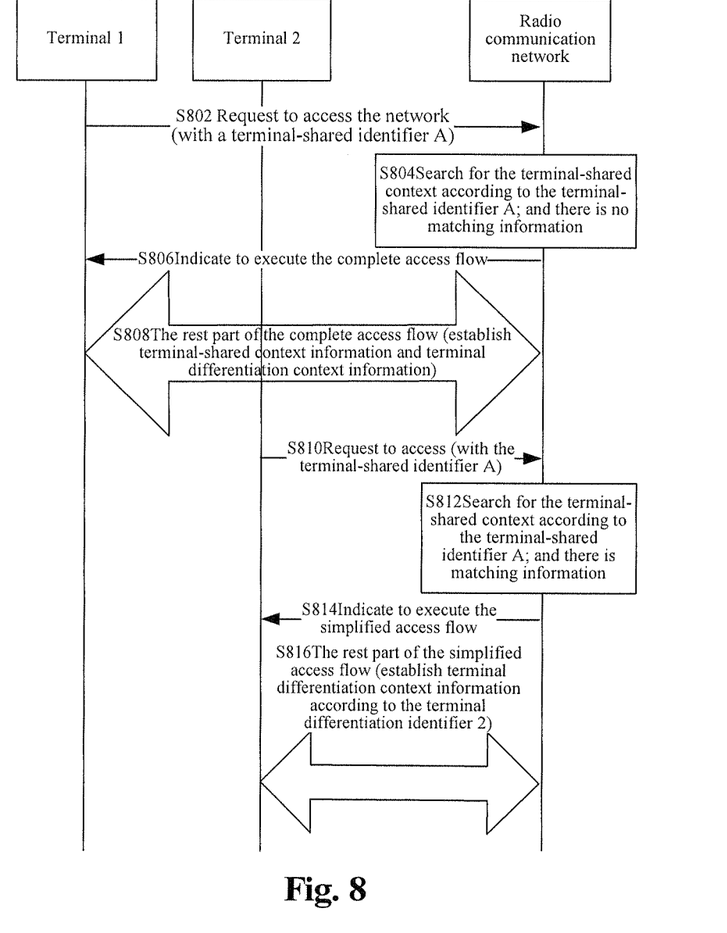
FIG. 8 is an interaction flowchart according to a case 4 of the disclosure.

FIG. 8 is the interaction flowchart according to the case 4 of the disclosure. As shown in FIG. 8, the following steps can be included.

Step S802: Terminal 1 requests to access the network, carrying a terminal-shared identifier A.

Step S804: The radio communication network looks for the terminal-shared context according to the terminal-shared identifier A; and there is no matching information.

Step S806: The radio communication network responds to the access request of terminal 1, and indicates to execute the complete access flow.

Step S808: Terminal 1 and the radio communication network execute the rest part of the complete access flow, and establish the terminal-shared context information and the terminal differentiation context information.

Step S810: Terminal 2 requests to access the network, carrying the terminal-shared identifier A.

Step S812: The radio communication network looks for the terminal-shared context according to the terminal-shared identifier A; and there is matching information.

Step S814: The radio communication network responds to the access request of terminal 2, and indicates to execute the simplified access flow.

Step S816: Terminal 2 and the radio communication network execute the rest part of the simplified access flow, and establish the terminal differentiation context information.

It is assumed that terminals 1, 2, . . . , n (n>1) belong to users of the same type and these terminals have certain trustable relation between themselves (for example, they may belong to a same enterprise user). These terminals are at the same level, and the flows of their accessing to the radio communication network are different due to the order of accessing of these terminals. Also, there may be superior-subordinate relation between the terminals, so that the superior node typically accesses the radio communication network first. It is assumed that terminal 1 accesses the radio communication network first. The terminal carries the terminal-shared identifier A and the terminal differentiation identifier 1 in the access request message. The radio communication network looks for the terminal-shared context according to the terminal-shared identifier A and there is no matching information. Then, the radio communication network indicates terminal 1 to execute the complete access flow.

During the rest part of the complete network access flow, the radio communication network establishes the terminal-shared context information. Furthermore, terminal 1 sends the terminal differentiation identifier 1 to the radio communication network. The radio communication network establishes the terminal differentiation context information for the terminal according to the terminal differentiation identifier 1 (and/or a newly allocated identifier related to this identifier). After successful access (by executing the complete network access flow), both the terminal-shared context information and the terminal differentiation context information is established.

Terminal 2 requests to access the radio communication network, carrying a terminal-shared identifier A. The radio communication network looks for the terminal-shared context according to the terminal-shared identifier A, and there is matching information. Then, the radio communication network responds to the request of terminal 2, and indicates to execute the simplified network access flow. Then, terminal 2 and the radio communication network execute the simplified network access flow. During this process, terminal 2 sends the terminal differentiation identifier 2 to the radio communication network. The radio communication network establishes the terminal differentiation context information according to the terminal differentiation identifier 2 (and/or a newly allocated identifier related to this identifier).

It is should be noted that while terminal 2 requests to access the network, terminal 1 may be still in the radio communication network or may have quitted (disconnected and/or de-attached) from the radio communication network. When terminal 1 quits, the radio communication network needs to retain the terminal-shared context information. In the simplified network access flow, it may be that terminal 2 needs to make certain kind of contact (or communication) with terminal 1 (the inter-terminal communication protocol may be different from or identical to protocols used by the terminals to access the radio communication network, and terminal 1 may send the terminal-shared context information to terminal 2 by broadcast, multicast and/or unicast). Then, terminal 2 can receive the terminal-shared context information (including information about security) from terminal 1. And terminal 2 executes the subsequent processing of the simplified network access flow according to the received terminal-shared context information.

The above description is only preferred embodiments of the disclosure and is not intended to limit the disclosure. Any modifications, equivalent replacements and improvements within the principle of the disclosure should be included within the protection scope of the disclosure.

It should be noted that steps shown in the flowcharts of the drawings may be executed in a computer system, such as a group of computer executable instructions. Furthermore, although the logic sequence is shown in the flowcharts, in some cases, the steps shown or described may be executed in an order different from the order mentioned here.

Figure 9:
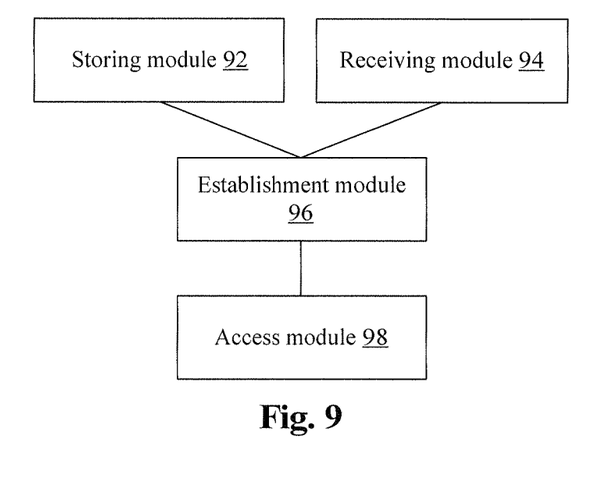
FIG. 9 is a structural block diagram of a radio communication network according to the embodiments of the disclosure.

The embodiments of the disclosure provide a radio communication network, which may be used to implement the above terminal access method. FIG. 9 is a structural block diagram of a radio communication network according to the embodiments of the disclosure, comprising: a storing module 92, a receiving module 94, an establishment module 96 and an access module 98.

The storing module 92 is configured to, after a first terminal accesses (connects and/or attaches to) the radio communication network, store first context information corresponding to a first identifier of the first terminal; the receiving module 94 is configured to receive an access request message from a second terminal, wherein the access request information carries a second identifier of the second terminal; the establishment module 96 is connected to the storing module 92 and the receiving module 94, and is configured to establish the second context information for the second terminal according to the first identifier, the first context information stored by the storing module 92 and the second identifier received by the receiving module 94; and the access module 98 is connected to the establishment module 96, and is configured to implement the access of the second terminal according to the second context information established by the establishment module 96.

In the related technologies, a huge non-data-service overhead is caused to the radio communication network if the access of each terminal is implemented without differentiation. In the embodiments of the disclosure, when the first identifier of the first terminal is correlated to the second identifier of the second terminal, the first context information established for the first terminal is identical or similar to the second context information established for the second terminal. Therefore, the establishment module 96 establishes the second context information according to the first context information. This solution may avoid duplicate establishment of the same information between the first context information and the second context information. Thus, the non-data-service overhead of the radio communication network during the establishment of the second terminal is reduced.

It should be noted that the radio communication network described in the device embodiments is corresponding to the method embodiments. The specific implementation process the radio communication network has been described in detail in the method embodiments and is not repeated here.

In conclusion, according to the embodiments of the disclosure, a terminal access method and a radio communication network are provided. With the disclosure, the radio communication network establishes context information for a newly accessing terminal according to the context information of the already accessed terminal and implements the accessing of the newly accessing terminal. The problem of huge non-data-service overhead caused to the radio communication network if the access of each terminal is implemented without differentiation is solved. Duplicate establishment of the same information in context information can be avoided. Hence, the non-data-service overhead of the radio communication network is reduced.

Obviously, those skilled in the art should understand that the above modules or steps of the disclosure could be achieved through general calculating devices. They can be concentrated in a single calculating device or distributed in a network formed by multiple calculating devices. Optionally, they can be achieved by program codes that can be executed by calculating devices. Thus, they can be stored in storage devices to be executed by calculating devices. Under certain situation, the shown or described steps can be executed according to an order different from the above order. Or, they can be achieved by respectively making them into many integrated circuit modules or by making multiple modules or steps among them into a single integrated circuit module. In this way, the disclosure is not limited to combinations of any specific hardware and software.

Above descriptions are only preferred embodiments of the disclosure and are not intended to limit the disclosure. For those skilled in the art, the disclosure may have various alternations and changes. Any modifications, equivalent replacements and improvements within the principle of the disclosure should be included within the protection scope of the disclosure.

What is claimed is:

1. A terminal access method, comprising:
a radio communication network storing a first context information corresponding to a first identifier of a first terminal, after the first terminal accesses the radio communication network;
the radio communication network receiving an access request message from a second terminal, wherein the access request message carries a second identifier of the second terminal;
the radio communication network establishing a second context information for the second terminal according to the first identifier, the first context information and the second identifier; and
the radio communication network implementing access of the second terminal according to the second context information;
wherein the radio communication network establishes the second context information for the second terminal according to the first identifier, the first context information and the second identifier comprises: when the first identifier is an identifier dynamically allocated by the radio communication network during access process of the first terminal, the dynamically allocated identifier corresponding to the first context information, and the radio communication network storing the dynamically allocated identifier; the second identifier comprising a matching part configured to match the dynamically allocated identifier; the radio communication network determining whether the matching part is identical to the dynamically allocated identifier stored by the radio communication network; and if yes, the radio communication network using the first context information corresponding to the dynamically allocated identifier as the second context information;
or,
the radio communication network establishes the second context information for the second terminal according to the first identifier, the first context information and the second identifier comprises: when the first identifier is a first access identifier used by the first terminal to access the radio communication network, the first access identifier corresponding to the first context information, and the radio communication network storing the first access identifier; the second identifier being a second access identifier used by the second terminal to access the radio communication network; the radio communication network acquiring a first shared identifier in the first access identifier according to a preset rule, wherein the first shared identifier is corresponding to a first shared part in the first context information; the radio communication network acquiring a second shared identifier in the second access identifier according to a preset rule, wherein the second shared identifier is corresponding to a second shared part in the second context information; the radio communication network determining whether the first shared identifier is identical to the second shared identifier; and if yes, the radio communication network using the first shared part as the second shared part and establishing the second context information according to the second shared part.

2. The method according to claim 1, wherein during the process that the first terminal accesses the radio communication network, the method further comprises:
the first terminal acquiring the dynamically allocated identifier which is allocated by the radio communication network; and
the first terminal sending the dynamically allocated identifier by broadcast, multicast and/or unicast.

3. The method according to claim 2, wherein after the first terminal sends the dynamically allocated identifier by broadcast, multicast and/or unicast, the method further comprises:
the second terminal receiving the dynamically allocated identifier; and
the second terminal using the dynamically allocated identifier as the matching part of the second identifier and carrying the second identifier in the access request message to be sent to the radio communication network.

4. The method according to claim 3, wherein the second terminal is a subordinate terminal of the first terminal.

5. The method according to claim 1, wherein when the second access identifier further comprises a second differentiation identifier, the step that the radio communication network establishes the second context information for the second terminal according to the first identifier, the first context information and the second identifier further comprises:
the radio communication network establishing a second differentiation part of the second context information according to the second differentiation identifier; and
the radio communication network considers the combination of the second shared part and the second differentiation part to be the second context information.

6. The method according to claim 5, wherein when the first terminal and the second terminal are in a same group, the first terminal uses an identifier of the group as the first shared identifier, and the second terminal uses the identifier of the group as the second shared identifier.

7. The method according to claim 1, wherein the radio communication network comprises at least one of: a control station and a gateway.

8. The method according to claim 1, wherein both the first terminal and the second terminal comprise: a terminal of machine type communication.

9. A radio communication network, comprising a hardware processor configured to execute software program units, wherein the software program units comprise:
a storing module configured to store first context information corresponding to a first identifier of a first terminal after the first terminal accesses a radio communication network;
a receiving module configured to receive an access request message from a second terminal, wherein the access request message carries a second identifier of the second terminal;
an establishment module which is connected to the storing module and the receiving module and configured to establish the second context information for the second terminal according to the first identifier, the first context information and the second identifier; and
an access module which is connected to the establishment module and configured to implement the access of the second terminal according to the second context information;
wherein the establishment module, is further configured to, when the first identifier is an identifier dynamically allocated by the radio communication network during access process of the first terminal, the dynamically allocated identifier corresponding to the first context information, and the radio communication network storing the dynamically allocated identifier; the second identifier comprising a matching part configured to match the dynamically allocated identifier; determine whether the matching part is identical to the dynamically allocated identifier stored by the radio communication network; and if yes, and use the first context information corresponding to the dynamically allocated identifier as the second context information;
or,
the establishment module, is further configured to, when the first identifier is a first access identifier used by the first terminal to access the radio communication network, the first access identifier corresponding to the first context information, and the radio communication network storing the first access identifier; the second identifier being a second access identifier used by the second terminal to access the radio communication network; acquire a first shared identifier in the first access identifier according to a preset rule, wherein the first shared identifier is corresponding to a first shared part in the first context information; acquire a second shared identifier in the second access identifier according to a preset rule, wherein the second shared identifier is corresponding to a second shared part in the second context information; determine whether the first shared identifier is identical to the second shared identifier; and if yes, use the first shared part as the second shared part and establishing the second context information according to the second shared part.

* * * * *